United States Patent

[11] 3,561,373

[72] Inventor Carl Robert Sievert
 Saginaw, Mich.
[21] Appl. No. 831,014
[22] Filed June 6, 1969
[45] Patented Feb. 9, 1971
[73] Assignee Baker Perkins Inc.
 Saginaw, Mich.
 a corporation of New York

[54] BAKERY CONVEYOR SYSTEM
 12 Claims, 4 Drawing Figs.
[52] U.S. Cl................................................. 107/57
[51] Int. Cl................................................. A21b 1/42
[50] Field of Search......................................... 107/57;
 34/189, 190, 203; 221/77, 84, 217, 253

[56] References Cited
 UNITED STATES PATENTS
1,118,030  11/1914  Lunt........................... 107/57
1,938,294  12/1933  Lauterbur et al............. 107/57
2,780,182  2/1957  Rand............................ 107/57X Primary Examiner—Louis K. Rimrodt
Attorney—Learman, Learman & McCulloch ABSTRACT: Bakery apparatus including bakery processing units for performing operations on panned products, a plurality of conveyors for conveying the pans between the units, and a pan support surface mounted between one end of one of said units and one of the conveyors for receiving the panned products. A pusher means is associated with the pan support surface which extends alongside one of the conveyors for moving the panned products between one of the conveyors and the supporting surface. Transfer apparatus is also provided for transferring the products between the supporting surface and one of the units. Drive control means is associated with each of the conveyors and the pusher means and is operative in response to the position of the panned products between the bakery processing units.

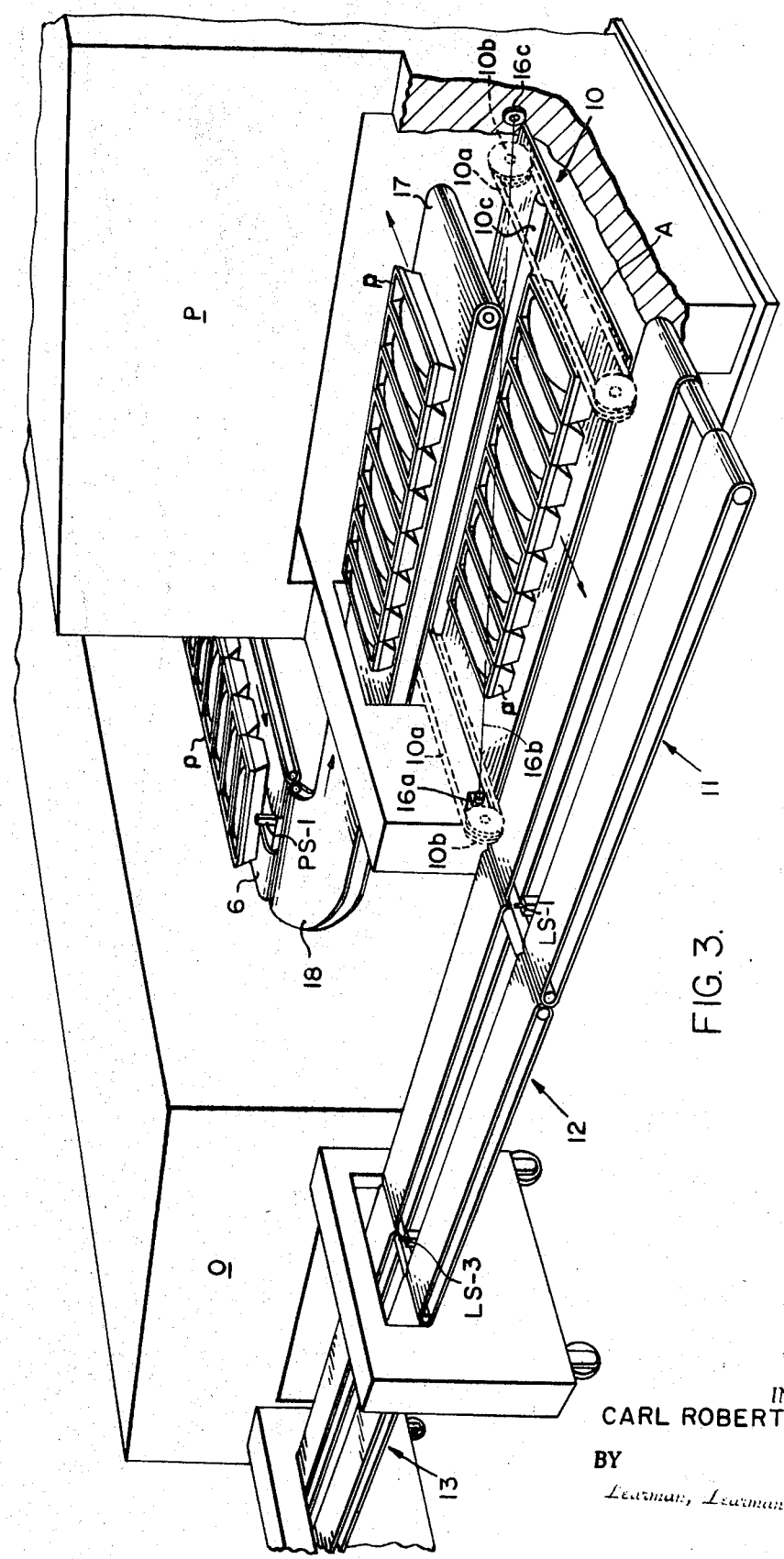

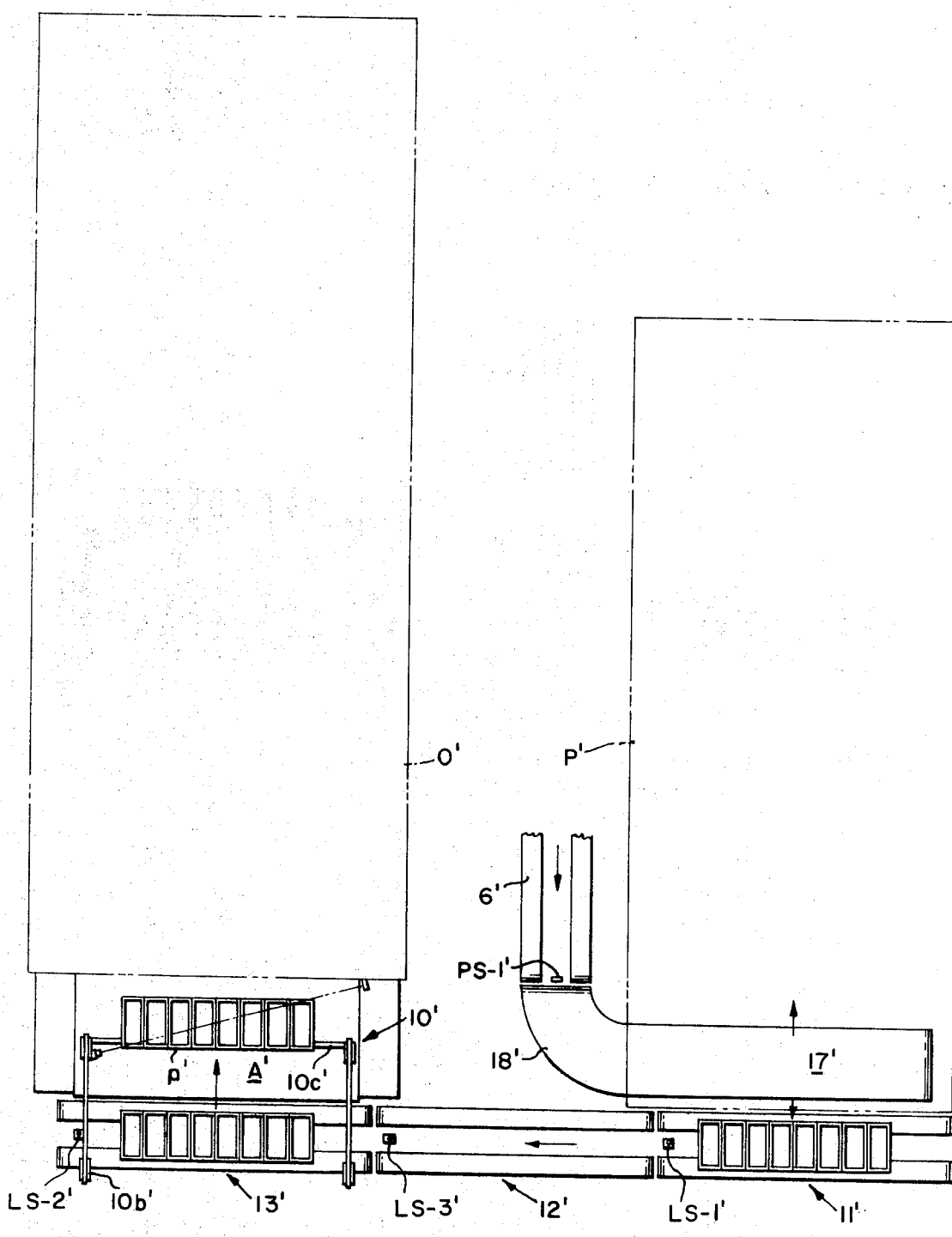

BAKERY CONVEYOR SYSTEM

This invention relates to conveyor systems and more particularly to interrelated conveyor mechanisms for use in transferring products such as pansets of proofed dough, which must be very gently handled, from one processing unit to another. Systems constructed in accordance with the present invention are employed to transfer pansets of proofed bread dough between the proofer and the oven, to transfer pansets of proofed roll dough from the proofer to the oven, and to transfer pansets of baked rolls from the oven to a cooler. Modern day bakeries are installing continuous dough mixing equipment which not only provides a very tender dough but also increases considerably the rate of production in the bakery and the rate of travel of the product to and through the various processing units. If pan stops are used in the bakery processing system, the greater speed of travel of the pansets means that the impact shock which is transmitted when the pansets engage the stops, or one another, is also considerably increased. In the present system, the use of conventional pan stops is avoided after the pansets of dough leave the proofer to insure that the pansets will not thereafter be stopped in an abrupt manner to transfer shocks to the dough which would deflate it.

In U.S. Pat. No. 3,294,037, which is assigned to the assignee of the present invention, apparatus is disclosed which incorporates a plurality of interrelated conveyors forming a system which transfers pansets from one bakery processing unit to another. The present invention provides an improvement to the system described in the above identified patent wherein the capacity of the bakery processing system is increased.

Briefly, in accordance with the present invention, there is provided bakery apparatus including a proofer unit, an oven unit, a series of electrically interrelated endless conveyors in end-to-end relation, and transfer means for transferring pansets between one end of one of the units and a support surface extending alongside one of the conveyors. Transfer apparatus is also provided for transferring products between the support surface and one of the conveyors. The conveyors and pusher apparatus are started and stopped to transfer pansets in groups in accordance with the presence or absence of a group of pansets at the conveyor immediately ahead along the line of transfer.

One of the prime objects of the invention is to avoid the use of an oven grouping conveyor and its associated pan stops while providing a system which is just as flexible and versatile as prior art systems and provides an adequate supply of pansets to fill the oven trays.

A further object of the invention is to provide a system which operates a full complement loading principle in the sense that the proofer grouping conveyor will not release a group of pansets until enough have accumulated to fill a shelf or tray of the proofer. In the present system, the number of pansets loaded on each proofer shelf or tray is always the same as the number loaded on the oven trays or hearth, and the steps between the proofer and oven provide sufficient storage so that the oven trays are under normal conditions always loaded with the product.

A further object of the invention is to provide a system which compensates for empty proofer trays, should the rate of supply of pans to the proofer be subnormal.

A still further object of the present invention is to provide a system of increased capacity.

Another object of the invention is to provide a system which is well suited to high capacity plants and is capable of handling the high speed production rates encountered.

Other objects and advantages of the invention will be pointed out specifically or will become apparent from the following description when it is considered in conjunction with the appended claims and the accompanying drawings, in which:

FIG. 3 is a partly schematic fragmentary, perspective view of the system illustrated in FIG. 1; and FIG. 4 is a schematic, top plan view illustrating an alternate embodiment of the invention.

Figure 1:
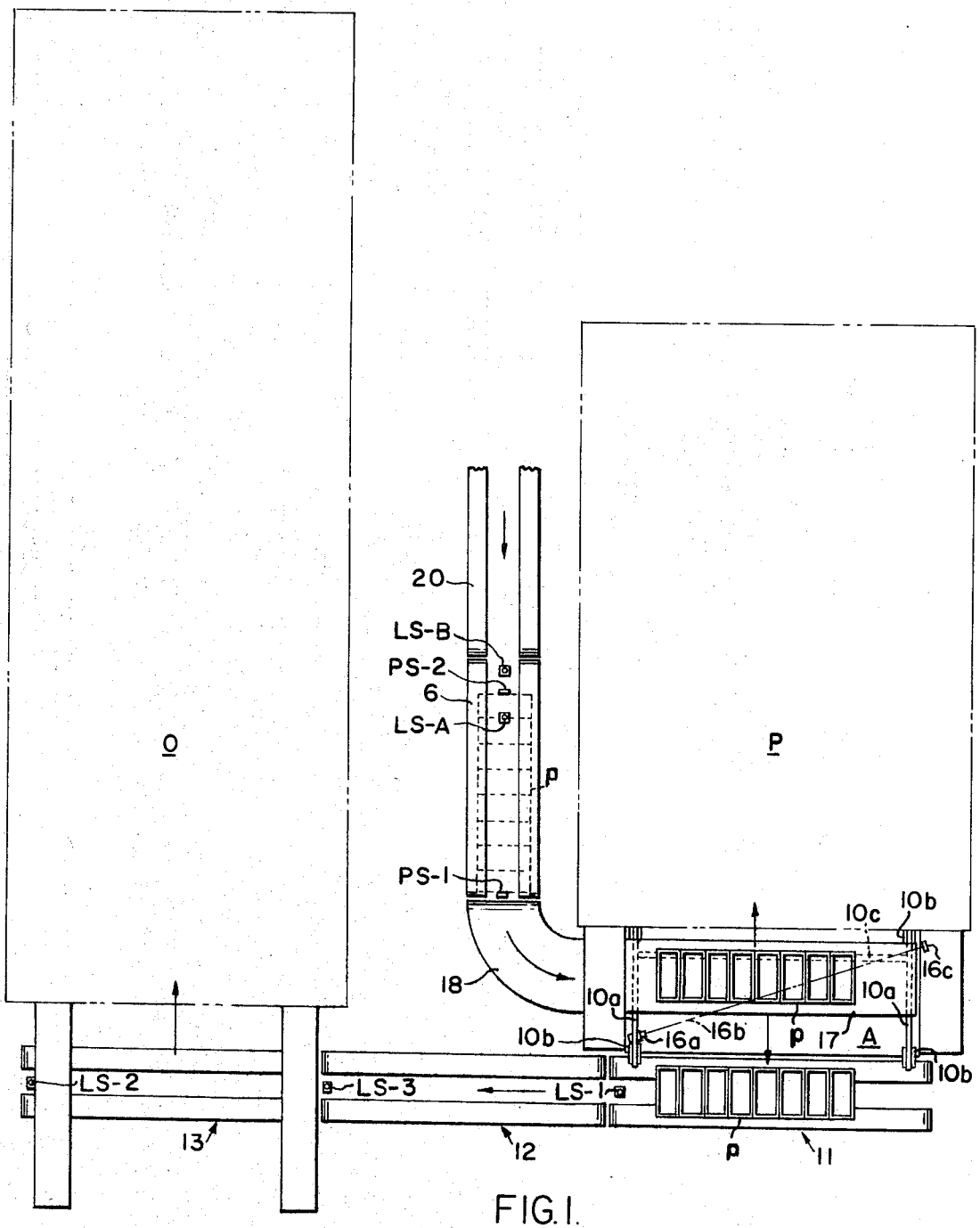
FIG. 1 is a schematic, top plan view illustrating one form of system in which pans are supplied to a proofer and transferred to an oven.

Referring now more particularly to the accompanying drawings, a letter P generally indicates a proofer, which may be a rack type proofer of the type illustrated in U.S. Pat. Nos. 2,823,811 and 2,931,483 and incorporated herein by reference. For purposes of convenience, it will be assumed that the proofer P is a rack type proofer and that it includes a loading conveyor 17 (see FIG. 3) of the type shown in U.S. Pat. Nos. 2,823,811 or 2,931,483. As will be described more fully hereinafter, the conveyor 17 presents groups of pansets $p$ to the proofer P. The pansets may be loaded onto the shelves or trays of the proofer P by the proofer loader-unloader in the usual manner (see the patents mentioned).

After the pansets $p$ pass through the proofer, they are discharged in groups onto the support surface of shelf or dead plate A (FIG. 3). The pusher member 10 is disposed between the shelf A and conveyor 17 and comprises a pair of spaced-apart chain members 10a trained around sprockets 10b and having a pusher bar 10c disposed laterally therebetween which pushes the pansets from the support surface of shelf A to the conveyor 11. An electric motor, indicated in FIG. 2 by the starting coil 10a', is connected with sprocket members 10b to drive the endless chain members 10a. The conveyor 11 transfers the pansets $p$ to a conveyor 12 which in turn transfers them to the oven supply conveyor 13. It will be noted that the conveyors 11—13 are of substantially equal length and constitute steps along the transfer path to the oven 0. The conveyors 12 and 13 may comprise so-called table top conveyors employing a pair of spaced-apart runs of hingedly connected plates which constitute a conveyor surface or a pair of spaced-apart endless belt members as shown at 12'. Table top conveyors are well known and are illustrated in U.S. Pat. No. 1,966,659. The conveyor 11 may similarly suitably comprise a pair of spaced-apart belt conveyors or if desired, a table top conveyor.

Figure 2:
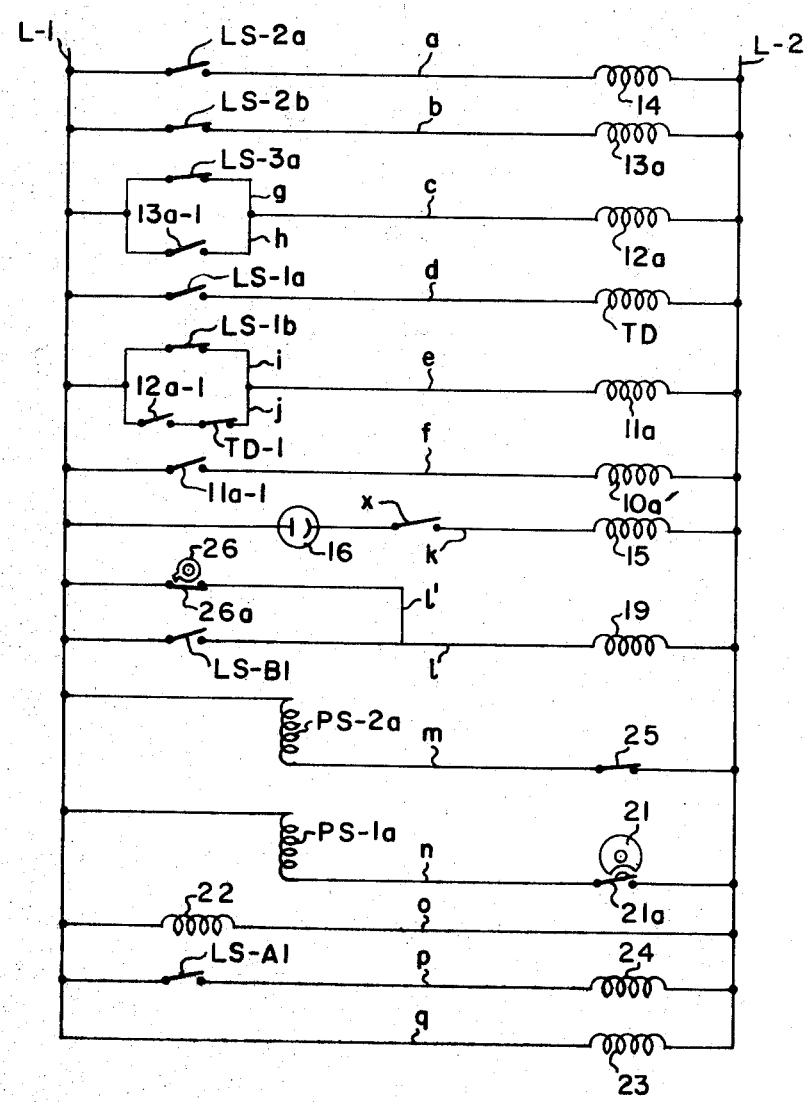
FIG. 2 is a circuit diagram illustrating the operation of the system.

For purposes of convenience, it will be assumed that the oven 0 is a traveling, tray type oven and that a sweep type loader of the type shown in U.S. Pat. No. 2,980,038 and also incorporated herein by reference transfers pansets $p$ from the conveyor 13 which leads in opposite the end of the oven to the trays of the oven conveyor. Each of the conveyors 11—13 is preferably driven by a separate electric motor of conventional type and these motors are represented in the electrical control diagram shown in FIG. 2 by the numerals 11a—13a, respectively, which designate the starting coils of the motors. Also incorporated in the circuit shown in FIG. 2 is the starting coil 14 of the motor driving the oven loader mechanism and the starting coil 15 of the motor driving the proofer unloading member (not shown). The proofer unloading member is operated intermittently in timed relation with the travel of the proofer racks as described in the patents mentioned. A start switch X is provided in the circuit line $k$ which is closed each time a proofer rack shelf moves into position to be unloaded.

The motor coil 14 is shown connected in a circuit line $a$ which bridges line wires L-1 and L-2 and the motor coil 13a is connected in a similar wire $b$. The motor coil 12a is connected in a wire $c$. A wire $d$ also bridges the lines L-1 and L-2 and includes the coil TD of a conventional time delay relay, as shown. Connected in the circuit line $e$ is the motor coil 11a and connected in the circuit line $f$ is the motor coil 10a. It is to be understood that the coils 10a—13a, and 14 could also be electrically operated clutch coils which, when energized, would selectively drive the various units described from a drive system powered by a single, large electric motor.

As shown in FIG. 1, a limit switch LS-1 is located at the front end of conveyor 11 between the runs thereof, a limit switch LS-3 is located at the front end of conveyor 12 between the runs thereof and a limit switch LS-2 is located at the front end of conveyor 13 between the runs thereof. These limit switches are of conventional type and include depressible actuator paddles which are depressed by pansets passing over them. The normally open contacts LS–2a of limit switch LS–2, which are connected in line a, are closed when limit switch LS–2 is actuated by pans moving forwardly on the conveyor 13, and the normally closed contacts LS–2b thereof, which are connected in the circuit line b, are simultaneously opened when the limit switch LS–2 is actuated. Connected in circuit line c are a pair of parallel lines g and h, as shown, and the normally closed contacts LS–3a of limit switch LS–3 are connected in the circuit line g, as shown. Connected in circuit line h are normally open contacts 13a–1, which are associated with the motor coil 13a and close when the coil 13a is energized. In addition to the time delay relay coil TD of a conventional timer, circuit line d includes the normally open contacts LS–1a of limit switch LS–1, which are closed when pans reach the front end of the conveyor 11 and limit switch LS–1 is actuated.

It will be seen that circuit line e incorporates a pair of parallel lines i and j. Connected in the line i are the normally closed contacts LS–1b of limit switch LS–1, and connected in circuit line j are the normally open contacts 12a–1, which are associated with motor coil 12a and are closed when coil 12a is energized. The normally closed time delay contacts TD–1, which are opened when time delay coil TD is energized, are also connected in line j. Provided in circuit line f are the normally open contacts 11a–1, which are closed when the motor coil 11a is energized.

Provided in a circuit line k is an electric eye or phototube 16 which controls the operation of the motor driving the proofer unloading element. In FIG. 1 the phototube 16 is represented by a light source 16a which directs a light beam 16b at a cathode 16c.

Normally, a full complement of pansets is loaded to each rack shelf or tray of the proofer. If not enough pansets are in position to provide a full complement of pansets for a shelf or tray of the proofer, the grouping conveyor 6 shown in FIG. 1 prevents any pans whatsoever from being loaded and that particular shelf or tray proceeds empty through the proofer. Conveyor 17, which may be presumed to lead into the proofer above proofer discharge conveyor 10, may be connected with a 90°turn conveyor 18 and it may be assumed that a single motor drives conventional conveyors 17 and 18, which may be mechanically coupled by chains and sprockets or coupled in any suitable manner.

In the circuit diagram, FIG. 2, additional circuit lines 1–q spanning line wires L–1 and L–2 are provided and the motor driving the conveyors 17 and 18 is designated by its starting coil 19, which is connected in circuit line 1. The grouping conveyor 6 supplies conveyor 18 and it is in turn supplied by a conveyor 20 connected with the dough mixing and panning unit. The conveyor 6 is preferably a table top conveyor of the same character as described above and comprises spaced-apart runs, as shown. Situated between the runs at the front end of the conveyor 6 is a pan stop PS–1, which is represented in the circuit diagram, FIG. 2, by its actuating solenoid PS–1a in circuit line n. Also provided in circuit line n is a conventional cam operated limit switch whose cam 21 is driven by the motor driving conveyors 17 and 18 and whose spring returned, normally open contacts 21a are open except when closed by the cam 21. A similar cam operated switch having a cam 26 driven by the motor driving conveyors 17 and 18 has normally closed contacts 26a in circuit line 1′ which function to maintain the motor driving conveyors 17 and 18 in operation for the required period.

Situated at a predetermined distance behind pan stop PS–1 is a second pan stop PS–2 which is represented in the circuit diagram, FIG. 2, by its actuating solenoid PS–2a in circuit line m. The circuit lines o and q are provided for the starting coils 22 and 23, respectively, of the motors which drive conveyors 6 and 20. Mounted immediately ahead of the adjustable pan stop PS–2 is a limit switch LS–A of the same character as the limit switches previously mentioned and it may be assumed for the sake of convenience that when eight pansets are grouped behind the pan stop PS–1, the last panset will rest on and actuate the limit switch LS–A. The system, of course, can be set to supply groups in which a different number of pansets comprise a group. Also provided between the runs of the grouping conveyor 6 is a limit switch LS–B which is positioned to be actuated when the pan stop PS–2 rises. The limit switch LS–A has normally open contacts LS–A1 in circuit line p, and the limit switch LS–B has normally open contacts LS–B1 in circuit line 1. A timer relay of conventional type is provided which has a timer coil 24 in circuit line p and normally closed timer contacts 25 connected in circuit line m. The timer may be the timer model 9050–ROIE manufactured by Square D. Company of Milwaukee, Wisconsin, U.S.A., wherein the time delay occurs before contacts 25 are opened.

It is to be understood that the pan stops PS–1 and PS–2 are conventional solenoid actuated pan stops which are in lowered position when their solenoids are energized and which are spring returned to "up" position when their solenoids are deenergized. With the pan stop PS–1 normally in raised position, a group of pansets will accumulate on the grouping conveyor 6 until enough have accumulated for the limit switch LS–A to be depressed. Switch contacts LS–A1 will be closed and timer coil 24 energized to open timer contacts 25 after a time delay. When timer contacts 25 open, solenoid PS–2a of pan stop PS–2 is deenergized so that pan stop PS–2 rises. As it rises it actuates limit switch LS–B, which closes the normally open contacts LS–B1 in line 1 and energizes the starting coil 19 of the motor driving conveyors 17 and 18. The conveyors 20 and 6, for purposes of this disclosure, may be assumed to be driven continuously. When the motor starting coil 19 is energized and the conveyors 17 and 18 are driven, the cam 21 is rotated and the contacts 21a are closed to energize the solenoid PS–1a in circuit line n so that the pan stop PS–1 is lowered and pansets are fed from the grouping conveyor 6 to the conveyor 18 and on to the conveyor 17. The coil 19 is maintained energized by the cam 26 permitting contacts 26a to close even though contacts LS–B1 open when the last panset of the group moves off limit switch LS–A and limit switch LS–B is deactuated by the lowering of pan stop PS–2. By the time the cam 21 has rotated sufficiently to again permit contacts 21a to open so that solenoid PS–1a is deenergized and the pan stop PS–1 is again raised, the requisite group of pansets has been fed onto the conveyor 17 in position to be loaded into the proofer P by the proofer loader element. During the time that the group pansets are being transferred to the conveyor 17, a second group of pansets has been proceeding from conveyor 20 onto grouping conveyor 6 and will be stopped by the pan stop PS–1 when it rises. Since it is necessary that the timer 24 time out before pan stop PS–2 rises, normally open circuit m is unaffected by the pansets simply proceeding across limit switch LS–A forwardly toward the pan stop PS–1. The limit switch LS–A, while momentarily depressed by such pansets, does not open the normally closed circuit line m until such time as the last panset of the designated group has depressed it for a time period greater than the timing period of the timer. Pan stop PS–2 remains in "up" position long enough to create a gap between the pan groups, and a timer (not illustrated) could be actuated by limit switch LS–B to create a gap of approximately 24 inches, if desired.

In the present invention case it will be assumed, for the sake of convenience, that a group of eight pansets is supplied to each shelf of the rack type proofer P and will be discharged from the proofer P onto the conveyor 10. So that the pansets will remain in groups, without the need for pan stops or a grouping conveyor in the transfer operation, the length of conveyors 11—13 is substantially or generally the same.

It will be assumed initially that the first eight pansets of the particular cycle are in position on the support surface of shelf A and that pusher 10 is operating to move them forwardly toward conveyor 11, inasmuch as motor coil 10a′ is energized and contacts 11a–1 in circuit line f are closed. With conveyors 11—13 empty, the normally closed limit switch contacts LS–1b are closed and motor coil 11a of the motor which drives conveyor 11 is also energized. Likewise, motor coil 12a in circuit line c is energized because the normally closed contacts LS-3a, of limit switch LS-3 are closed, and the coil 13a in circuit line b, of the motor for driving conveyor 13 is also energized because the normally closed contacts LS-2b of limit switch 2 are closed. The conveyor 11—13 are driven at substantially the same speed. The speed of operation of the proofer discharge sweep pusher 10, and the oven loading member must, of course, be correlated with the speeds of the interrelated conveyors.

When the leading pansets of the panset group actuate limit switch LS-1, the normally open contacts LS-1a in circuit line d are closed and the relay coil TD is energized. At the same time, the normally closed contacts LS-1b are opened. When the limit switch contacts LS-1a are closed, energization of the relay coil TD causes the normally closed contacts TD-1 to open at the same time that contacts LS-1b are opened and motor coil 11a is therefore deenergized so that the conveyor 11 stops, and during the prescribed time delay interval, lidding can take place. Of course, lidding may be accomplished manually or automatically, as desired. The timer may be a conventional timer, model 9050-ROID, manufactured by Square D. Company of Milwaukee, Wisconsin, U.S.A., wherein the time delay occurs after the contacts TD-1 are opened and when the timer times out contacts TD-1 are closed and coil 11a is energized so that the conveyor 11 moves forwardly once again. During the time that the conveyor 11 is halted for the lidding operation and coil 11a is deenergized, the contacts 11a-1 in circuit line f are opened so that coil 10a is deenergized and the operation proofer discharge of pusher 10 is also halted.

When the first group of pansets reaches the limit switch LS-3, the normally closed contacts LS-3a are opened. However, since the motor coil 13a is energized and contacts 13a-1 remain closed, the conveyor 12 is not stopped and the pansets proceed on to conveyor 13. The first group of pansets continues to move onto conveyor 13 until the foremost panset engages and actuates limit switch LS-2. When this occurs the normally closed contacts LS-2b of limit switch LS-2 in circuit line b are opened and coil 13a of the motor which drives conveyor 13 is deenergized so that the conveyor 13 stops. At the same time, the normally open contacts LS-2a of limit switch LS-2 in circuit line a are closed and the coil 14 which controls the operation of the oven loader is energized to start the loading operation and sweep the pansets from the conveyor 13 into the over 0. Desirably, a mechanically operated, normally open limit switch indicating that the particular oven tray is in position to be loaded is provided in the circuit line a as a safety measure. However, it is not shown in the drawings since it forms no part of the present invention.

When limit switch LS-2 is actuated and the motor coil 13a is deenergized, the motor contacts 13a-1 open. However, motor coil 12a will not be deenergized until a second group of pansets has moved onto the conveyor 12 and limit switch LS-3 is actuated to open the normally closed contacts LS-3a in circuit line g. Thus, limit switch LS-3 prevents pansets from conveyor 12 from moving onto the conveyor 13 during the loading operation, when pansets are in engagement with limit switch LS-2. When limit switch LS-2 is freed by the oven loader moving the pans from conveyor 13 into the oven, the conveyor 13 is started once again and the pans are free to move from the conveyor 12 onto the conveyor 13 once again because contacts 13a-1 close.

In the operation of the system a group of pansets will normally be in position on each of the conveyor 11—13 and the proofer discharge support surface, or moving into position thereon. The speeds of operation of the conveyor 11—13 and the proofer discharge pusher 10 and the unloading apparatus of the proofer and loading apparatus for the oven are correlated with the time required for lidding so that a full group of pansets is in loading position on the conveyor 13 by the time a conveyor tray of the continuously traveling oven conveyor is in position to be loaded.

It will be seen that the limit switch LS-2 functions to stop the conveyor 13 and to energize the oven loader 14a. At the same time, it operates to halt conveyor 12 at a time when pansets are in contact with limit switch LS-3 that the immediately succeeding group of pansets will not be fed onto conveyor 13 until the oven loader clears conveyor 13 and conveyor 13 is again operative. Limit switch LS-1, when actuated, functions to stop the pusher 10 and conveyor 11 while at the same time, assuming the conveyor 12 is in operation, operating a timer insuring that the conveyor 11 is stopped only for the requisite time to accomplish lidding. If a shelf or a rack in the proofer should be empty, as when the pansets are not being supplied to the proofer P at an adequate rate, the storage conveyors 11 and 12 permit the system to compensate in the sense that they will provide groups of pansets to fill the trays of the oven 0. In the event groups of pansets should back up onto support surface of shelf A, as when the oven 0 is running at too slow a speed for the proofer system and the pusher 10 is stopped, the motor coil 15 of the motor driving the proofer unloading element will be prevented from operating by the phototube 16 until the pansets on conveyor 10 move off shelf A onto conveyor 11.

Variations of the system shown in FIG. 1 are possible without departing from the scope of the invention. For instance, if it is not desired to perform a lidding operation, the time delay element, including its coil TD and contacts TD-1, and the limit switch contacts LS-1a, could be eliminated. Of course, the path to the oven could be circuitous in the sense that turns could be used, the only consideration being that the steps in the path from the proofer to the oven be approximately equal.

Referring now to FIG. 4, an alternate embodiment of the system is illustrated wherein the proofer discharge surface of shelf A and pusher 10 are removed so that the proofer discharges directly onto conveyor 11 and a similar support surface A' and pusher 10' are installed between conveyor 13 and the oven. Similar parts are designated with similar numerals followed by a prime designation. Similar limit switches are utilized in similar circuitry previously described to control the operation of the pusher between the conveyor 13' and the oven. In this embodiment, pusher 10' could conveniently comprise a conventional overhead pusher of the type illustrated at 31 in FIG. 3 of previously mentioned U.S. Pat. No. 3,294,037. This pusher would sweep the pansets P' from conveyor 13' onto shelf A' where the oven loading transfer member would move the pansets P' into oven O' in the conventional manner.

It should also be noted that shelf A or A' need not necessarily comprise a portion of the proofer or oven but could conveniently comprise a separate unit attached to the front of the proofer or oven.

The new and improved baking apparatus results in up to a 20 percent increase in capacity over the dough handling equipment disclosed in U.S. Pat. No. 3,294,037 and therefor represents a substantial advance in the art.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Bakery apparatus comprising:
   bakery processing units for performing operations on panned bakery products;
   first conveyor means including a traveling portion on which the products are received from one of the units;
   an intermediate conveyor system including a traveling portion for receiving and transferring products from said first conveyor means;
   additional conveyor means including a traveling portion for receiving the products from the intermediate system conveyor means and advancing them along the additional conveyor means;

support means having a generally horizontally extending support surface for receiving said products;

first means for transferring said products between one of said conveyor means and said surface; and second means for transferring said products between said surface and one of said processing units.

2. Bakery apparatus as set forth in claim 1 wherein said support surface extends alongside either said first conveyor means, and said first transfer means pushes said products in a path normal thereto.

3. Bakery apparatus as set forth in claim 2 further including:
means for driving said first transfer means;
sensing means positioned to be actuated when said products are moved to a predesignated position on said first conveyor means; and
first means responsive to said sensing means for disabling said means for driving said first transfer means.

4. Bakery apparatus as set forth in claim 3 wherein said first means responsive to said sensing means is connected in circuit with said means for driving said first transfer means.

5. Bakery apparatus as set forth in claim 4 wherein said first means responsive to said sensing means includes actuating contacts connected in series circuit relation with said means for driving said first transfer means, said actuating contacts and said means for driving said first transfer means being adapted to be connected across a source of electrical power.

6. Bakery apparatus as set forth in claim 5 including first drive control means for causing driving of said traveling portion of said first conveyor means; and second means responsive to said sensing means for disabling said first drive control means.

7. Bakery apparatus as set forth in claim 6 wherein said second means responsive to said sensing means includes second switch contacts connected in series circuit relation with said first drive control means, said second switch contacts and said first drive control means being adapted to be connected across said source of electrical power.

8. In a bakery system including proofer means, oven means, and conveying apparatus for conveying proofed dough in pans between said proofer and oven means; first, second and third conveyor means in front to rear relation; first, second, and third drive control means associated with said first, second, and third conveyor means, respectively, and operative in response to movement of said pans to a predesignated position on said first, second, and third conveyor means respectively, the improvement comprising:

article support means extending between either said proofer means or said oven means and one of said conveyor means;

means mounting said support means at substantially the level of said one conveyor means;

generally horizontally extending first transfer means disposed adjacent said one conveyor means and traveling in a direction normal to the direction of travel of said one conveyor means;

said first transfer means moving said pans between said one conveyor means and said article support means; and second transfer means for transferring said pans between said article support means and either of said oven means or said proofer means.

9. A bakery system as set forth in claim 8 including means for driving said second transfer means;
sensing means responsive to the position of said pans between said proofer and oven means; and
means responsive to said sensing means for disabling said means for driving said second transfer means.

10. Bakery apparatus as set forth in claim 8 wherein said second transfer means comprises unloading pusher means mounted in said proofer means.

11. A bakery system; bakery processing units for performing operations on panned products, said system comprising:
electrical circuit means including a power source;
a first conveyor means including a portion adjacent one of the units and on which a plurality of successive panned products are received from the said unit;
said first conveyor means including a traveling portion;
a first circuit line in said circuit means having means for causing driving of said traveling portion for transferring products;
second conveyor means including a traveling portion for transferring panned products;
a second circuit line in said circuit means having means for causing driving of said traveling portion included with said second conveyor means;
third conveyor means including a portion extending toward the second bakery processing unit, said third conveyor means including a traveling portion for transferring panned products;
a third circuit line in said circuit means having means for causing driving of said traveling portion included with said third endless conveyor means;
first sensing means positioned to be actuated when panned products are moved to a predesignated position on said third conveyor means for disabling the travel of said traveling portion included with the third conveyor means;
second sensing means positioned to be actuated when panned products are moved to a predesignated position on said second conveyor means and connected in said circuit means for disabling the travel of said traveling portion included with the second conveyor means when the traveling portion included with said third conveyor means is disabled;
third sensing means connected to disable the means causing driving of said traveling portion included with said first conveyor means when the traveling portion included with the second conveyor means is disabled;
one of said bakery processing units including article support means adjacent one end thereof at substantially the level of one of said conveyors means for receiving said products;
first product pusher means associated with said article support means for moving said products between said one conveyor means and said article support means; and
second product pusher means for moving said products between said article support means and said one of said bakery processing units.

12. A bakery system as set forth in claim 11 including:
means for driving said first pusher means; and
means responsive to said third sensing means for disabling said means for driving said first pusher means.